United States Patent
Blinn

(10) Patent No.: US 10,554,417 B2
(45) Date of Patent: *Feb. 4, 2020

(54) SCRIPT VERIFICATION USING A HASH

(71) Applicant: Go Daddy Operating Company, LLC, Scottsdale, AZ (US)

(72) Inventor: Arnold Neil Blinn, Hunts Point, WA (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/278,999

(22) Filed: Feb. 19, 2019

(65) Prior Publication Data
US 2019/0190722 A1 Jun. 20, 2019

Related U.S. Application Data

(63) Continuation of application No. 15/408,264, filed on Jan. 17, 2017, now Pat. No. 10,250,389.

(51) Int. Cl.
| | | |
|---|---|---|
| *H04L 29/06* | (2006.01) | |
| *H04L 29/12* | (2006.01) | |
| *H04L 9/32* | (2006.01) | |
| *H04L 29/08* | (2006.01) | |

(52) U.S. Cl.
CPC .......... *H04L 9/3247* (2013.01); *H04L 9/3236* (2013.01); *H04L 9/3239* (2013.01); *H04L 9/3263* (2013.01); *H04L 63/00* (2013.01); *H04L 63/123* (2013.01); *H04L 67/02* (2013.01); *H04L 61/1511* (2013.01); *H04L 63/0823* (2013.01)

(58) Field of Classification Search
CPC ..... H04L 9/3236; H04L 9/3247; H04L 67/02; H04L 67/34; H04L 9/0838; H04L 63/061
See application file for complete search history.

(56) References Cited

U.S. PATENT DOCUMENTS

| | | | |
|---|---|---|---|
| 7,975,019 B1 * | 7/2011 | Green | G06Q 30/0241 709/217 |
| 8,578,499 B1 * | 11/2013 | Zhu | G06F 21/567 713/154 |
| 9,680,779 B2 * | 6/2017 | Marovets | H04W 4/14 |
| 10,250,389 B2 * | 4/2019 | Blinn | H04L 67/02 |
| 10,333,716 B2 * | 6/2019 | Blinn | H04L 9/3247 |
| 2016/0182563 A1 * | 6/2016 | Sambandam | H04L 63/123 726/22 |
| 2017/0289178 A1 * | 10/2017 | Roundy | H04L 63/1416 |

* cited by examiner

*Primary Examiner* — Mohammad A Siddiqi
(74) *Attorney, Agent, or Firm* — Greenberg Traurig, LLP

(57) ABSTRACT

Systems and methods of the present invention provide for one or more server computers communicatively coupled to a network and configured to: identify, within a data store: a web page including a script tag; a URL in the script tag referencing a location for a second server hosting a script file; and a first hash data in the script tag generated from the script file using a hash function algorithm. The server computer(s) execute a request that accesses the script file and a second hash generated from the script file and stored on the second server computer. If the second hash data does not match the first hash data, execution of the script tag is disabled, and a notification is generated.

16 Claims, 7 Drawing Sheets

```
File  Edit  Tools            ⇐ ⇒
```

Script/Tag Management Software

Rule 1:

If notification generated because hash tags do not match:

| Transmit email notification to Security Center ▽ |

| Disable all script tags and/or scripts within pages ▽ |

Rule 2:
If signature file, public key, and/or security certificate cannot be verified:

| Transmit email notification to Security Center ▽ |

| Disable all script tags and/or scripts within pages ▽ |

SUBMIT

FIG. 7

SCRIPT VERIFICATION USING A HASH

CROSS-REFERENCE TO RELATED APPLICATIONS

This application is a continuation of and claims priority to U.S. patent application Ser. No. 15/408,264 entitled "SCRIPT VERIFICATION USING A HASH" and filed on Jan. 17, 2017.

FIELD OF THE INVENTION

The present invention generally relates to the field of authentication for software script files and specifically to the field of generating a cryptographic hash or a digital signature in order to verify a script file created by a script vendor.

SUMMARY OF THE INVENTION

The present invention provides systems and methods comprising at least one processor executing instructions within a memory coupled to a first server computer coupled to a network, the instructions causing the first server computer to identify, within a data store, a URL of a script file. The URL of a hash may be derived, or alternatively also stored. The first server computer executes a Hypertext Transfer Protocol (HTTP) request that accesses the script file, verifies the integrity of the script by generating a hash data, and compares the generated hash data to a known value. The server computer may further identify, within the data store, at least one web page that includes the script. If the generated hash data does not match the known hash data, the server may subsequently modify the identified pages to remove and/or disable the script, and generate a notification that the generated hash data does not match the known hash data. In embodiments where a browser determines that the generated hash data does not match the known hash data, the browser may disable and/or remove the script.

In some embodiments, the present invention provides systems and methods comprising at least one processor executing instructions within a memory coupled to a first server computer coupled to a network, the instructions causing the first server computer to identify, within a data store, a URL of a script file. The first server computer executes an HTTP request that accesses the script file and a signature file generated by a private key, associated with the script file, and stored on one or more server computers. If the signature file contains a signature that cannot be authenticated using the public key associated with the private key, the server may subsequently modify the identified pages to remove and/or disable the script, and generate a notification that the generated hash data does not match the known hash data. In embodiments where a browser determines that the signature cannot be authenticated using the public key, the browser may disable and/or remove the script.

The above features and advantages of the present invention will be better understood from the following detailed description taken in conjunction with the accompanying drawings.

BRIEF DESCRIPTION OF THE DRAWINGS

FIG. 7 is a user interface illustrating a possible embodiment for authenticating a script file using a hash or a digital signature.

DETAILED DESCRIPTION

Figure 1:
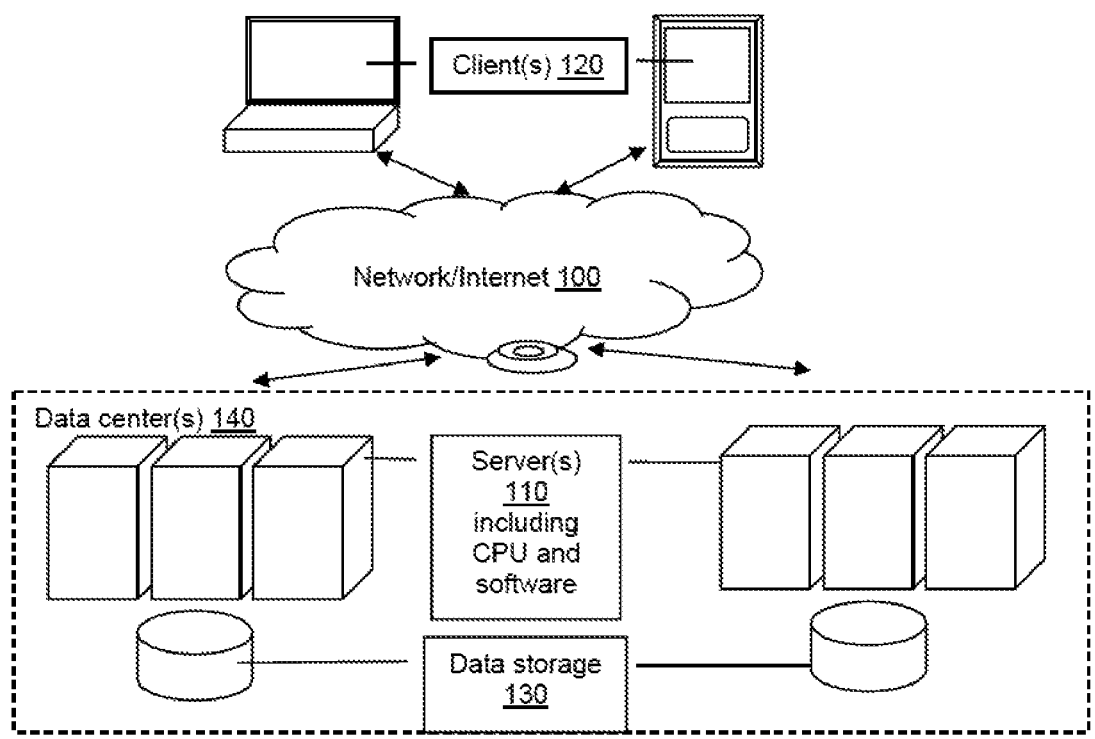
FIG. 1 illustrates a possible system for authenticating a script file using a hash or a digital signature.

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers place multimedia information (e.g., text, graphics, audio, video, animation, and other forms of data) at specific locations on the Internet referred to as websites. The combination of all the websites and their corresponding web pages on the Internet is generally known as the World Wide Web (WWW) or simply the Web.

Prevalent on the Web are multimedia websites, some of which may offer and sell goods and services to individuals and organizations. Websites may consist of a single webpage, but typically consist of multiple interconnected and related web pages. Websites, unless extremely large and complex or have unusual traffic demands, typically reside on a single server and are prepared and maintained by a single individual or entity. Website browsers are able to locate specific websites because each website, resource, and computer on the Internet has a unique Internet Protocol (IP) address.

IP addresses, however, even in human readable notation, are difficult for people to remember and use. A Uniform Resource Locator (URL) is much easier to remember and may be used to point to any computer, directory, or file on the Internet. A browser is able to access a website on the Internet through the use of a URL. The URL may include a Hypertext Transfer Protocol (HTTP) request combined with the website's Internet address, also known as the website's domain name.

A user operating a client computer may input a URL, including the domain name, into a browser running on a client computer. In response, the browser transmits a request to the web server hosting the multimedia website at the unique IP address associated with the URL/domain name. The web server accesses, and possibly processes, the source code for a web page, resulting in a web page for display, which may include combinations of web-friendly languages such as Hypertext Markup Language (HTML) and JavaScript. The server then transmits the generated source code for the web page back to the user's browser, which interprets the source code and displays it on the display device for the user's client machine.

The source code, specifically HTML, provides a framework allowing website designers and/or administrators to include script tags within the source code of their website. These script tags may include specific URLs (which may be directed to servers/IP addresses that are different for the web server's URL) directing the browser to files (e.g., JavaScript files), which are downloaded from the URL and executed by the browser. For example, a website designer may include the tag <script language="JavaScript" src="http://www.vendor.com/examplescript.js"> within a web page's HTML code. By including this script tag, web browsers and/or servers are able to identify the source of the script, using the "src=" attribute within the tag, and are able to locate, download, interpret, and execute the code found at this URL. The location may be any IP address and/or server accessible by the browser on the internet.

These script tags may provide conveniences and better efficiencies for website administrators (e.g., website owners, operators, or hosting providers), which may improve site performance and conserve bandwidth by offloading the hosting responsibility for the script files to third party script vendors, which may host files such as the script file or website stylesheets on the script vendors' hosting servers, possibly within a Content Delivery Network (CDN).

The third party script vendors may then share the script file(s) among multiple sites configured to access the script file, possibly via script tags within their web pages. By including script tags integrating these third party scripts within their websites (possibly for a fee), the website administrators, as customers of the script vendors, may improve the tracking, analytics, fraud detection, anti-script tampering detection, or any other performance or security efficiencies of their hosted websites.

Unfortunately, this also means that the script file executed when the browser or server identifies the URL within the script tag and requests the script at that URL, sometimes requires that the script is served from a domain that the website administrators do not control. This, in turn, may compromise the integrity of the website. For example, the referenced script may affect the performance of the website (e.g., slowing the loading time of the web page), in which case the website administrator will want to remove references to the scripts within the administrator's web pages in order to improve performance.

Another risk involves a hacker or other unscrupulous user gaining control of the scripts. In other words, security problems inherent in various means of hacking introduce vulnerabilities into the hosted websites, possibly via the included script tags. For example, hackers or other unscrupulous users may exploit available attack vectors to redirect or reprogram the code requested and downloaded from the URL within the script tag, and may redirect the browser to instead execute code on the hacker's server The hacker may inject arbitrary malicious content into the available script files (or replace the script files completely) and thus potentially attack all sites that fetch files from the script vendor's hosting servers or CDN. For example, a hacker may inject key logger code within the script, causing the code to record all keystrokes entered by a user visiting that web page. This critical user information (e.g., a user's login and password information) may then be forwarded to the hacker, who intercepts keys logged, and/or acts as a man in the middle.

Website administrators are therefore seeking new ways to authenticate the source and security of software code, such as script files executed via the user's browser or a server, when accessing data online. One solution may include a contract with the script vendors, in which the website administrators are compensated for any inefficiencies and/or any security breaches caused by the script. While this may remedy some problems, the script vendor's reputation for efficiency and security may be irreparably damaged.

Another solution may include the third party vendor transmitting the source code for the script (and/or a verification hash file, digital signature file, and/or public key, described in more detail below) to the website administrator for inclusion on their web servers, allowing the website administrator to provide sufficient security for the script file. However, as the script vendor updates the script, the script file stored on the customer's web servers will then be out of date, requiring the script vendor to again send the updated script file, and the website administrator to update the security around this file, which may become impractical.

Perhaps the most efficient solution, described in more detail below, is an architecture in which the third party vendor hosts the scripts, and is able to update the scripts, while simultaneously providing and updating the associated security measures. This may reassure the website administrator that the security around the script will not cause security concerns for their customers. Thus, systems and methods are needed in the art that allow the user or script vendor to verify the security around the scripts being referenced and accessed by customers and website administrators.

In disclosed embodiments, the script vendor may store the script file on a server available via the Internet, and may update the script file as needed for new functionality, security updates, and so forth. For example, one or more servers operated by the script vendor may execute a hash function to generate a hash from, and/or to be associated with, the script file. This hash function may be a one-way function (i.e., a function that easily generates the hash from data associated with the script file as an input, but is difficult to reverse in order to recreate the original script file data used to generate the hash). Thus, the hash function may use data associated with the script file as the input for the hash function, and the results of the hash function (referred to as a hash or digest) may generate a unique string associated with the script file without applying cryptography to its contents.

In some embodiments, the hash/digest may be automatically transmitted to each of the script vendor's customers, specifically the parties using the script file. Each time the script vendor changes or otherwise updates the script file, the server(s) operated by the script vendor may run the hash function to update the hash or digest, and transmit the updated hash or digest to the customers. In some embodiments, the hash function may be transmitted to one or more servers separate from the server hosting the script file, thereby separating the files and requiring a hacker to breach the security of both systems to spoof the hash file validation.

In disclosed embodiments, the server(s) operated by the script vendor may also store a private key received from a certificate authority that has generated a public/private key pair used within a public key infrastructure (PKI). The script vendor may store the private key in a server which is out of band, meaning that the private key is stored on one or more servers that are not publicly accessible, are separate from the script file, public key, etc., and apply well established best practices or security measures for creating signatures on source code.

Because the public key from this key pair is used to verify that the digital signature files used to sign the script file, it is important to associated with the described below (as well as any digital certificates verifying that public keys or signatures were issued to and/or signed by the script vendor) the script vendor may store the private key within storage on hardware applying well established best practices or security measures for creating signatures on source code.

The script vendor's server(s) may use the private key to generate a digital signature to sign the script file to verify that the script file has not been corrupted or hacked. Given the publicly available public key, anyone may analyze the digital signature in order to verify that the signature associated with the script file is correct and that the script file has not been tampered with.

Thus, public/private key cryptography may be applied to the script file without encrypting the data within the script file itself. Specifically, the script vendor may apply code signing to the script file by using the private key issued to the script vendor to sign the source code of the script file. The script vendor may then make the public key available to the script vendor's customers via a publicly available server, for example. The publicly-available file may include, for example, the script file examplescript.js, retrieved from the script vendor's servers via a script tag <script src ="https://www.vendor.com/examplescript.js">, and a sister digital signature file examplescript.sig, stored in association with the script file. As with the hash files described above, as the script file is created or updated, the script vendor's server(s) may be configured to automatically generate/update a digital signature file associated with the script file, which may be stored on one or more servers, possibly out of band.

One or more web servers, operated by a customer of the script vendor, may receive a request for a web page hosted on that server, and process the request to generate the HTML for the web page. In browser-based embodiments described below, the customer's web server may transmit the HTML to the requestor's browser. This HTML code may include script tags identifying the URL of a script to be executed. This script may include third party code that the customer has no control over, such as the script file hosted on the script vendor's server(s). The browser parses the HTML code to process the script tag in order to request the script file from the script vendor's server(s). The browser may request the script files, determine if the valid hash is included in the requested script files, and verify and/or enforce the hashes. In server-based embodiments, described in more detail below, one or more servers may store a list of scripts and valid hashes. The server(s) may request the script files, determine if the valid hash is included in the requested script files, and verify and/or enforce the hashes.

In both browser and server-based embodiments, the customer may include, within a script or link tag, an attribute including the URL directing the browser or server to the script vendor's server hosting the script file (e.g., <script src="https://www.vendor.com/examplescript.js">). The script file and/or the script tag may also include a hash attribute (e.g., <script src="https:www.vendor.com/examplescript.js" "hash=sha384-abC1Def2hij3+KLM4/nOp>"). The browser may download the script file, generate a hash, and verify that it matches. In server based embodiments, the server doing the hash validation would store a list of scripts (e.g., URLs) and hashes, and use this stored data to verify that the stored hash matches.

In browser-based embodiments, the browser may support an established standard requiring the browser to identify the tag attribute containing the hash, and compare the tag attribute with a hash generated by the browser. If the hashes within the tag and generated from the script match, the browser may then verify that the script has not been changed since the time the vendor provided the generated hash for inclusion in the script or link tag.

However, due to the administration and configuration involved with proposing and implementing such a browser standard, server-based embodiments may store a flat file or database of script files and their associated URLs and hash/digests. The servers may then run a regular verification, possibly in a loop from multiple IP addresses in multiple data centers, thereby connecting to the servers and requesting the script files and verify the hash associated with each of these script files.

The server may therefore determine that each script file has not been modified since the hash has become available. These server-based embodiments may be implemented on one or more customer servers, possibly including the customer's web server hosting the website that includes the script and/or link tags, or by any other independent server on the Internet.

In browser-based embodiments, the browser may support an established standard requiring the browser, each time it downloads a script file, to also download the signature file associated with the script file on the script vendor's browser, then access the public key known to be issued to that script vendor, in order to verify that the signature originated with the script vendor. The identity of the public key and/or location of the public key would be placed alongside the script tag. The browser (and in server-based embodiments, the server) may verify and only trust the digital signature signed by the script vendor for the original source code for the script file is to be trusted.

Thus, if a hacker were to hijack the script from the script vendor's server, and were to attempt to generate their own signature file from a different private key, it would not pass verification. This is because the public key associated with the script wouldn't verify the signature.

To avoid the administration and configuration involved with proposing and implementing a browser based standard implementation, server-based embodiments may verify the signature files associated with the script vendor's script file(s). The script vendor's servers may store a list of URLs for accessing the scripts, as well as their corresponding signatures and public keys. The script vendor's servers may then connect to and request the script files in order to verify the scripts, possibly in a loop from multiple IP addresses in multiple data centers. These server-based embodiments may be implemented on one or more customer servers, possibly the customer's web server(s) hosting the website that includes the script and/or link tags, or by any other independent server on the Internet.

If the browser determines that the digital signature associated with the script file is valid, the browser may be configured to allow execution of the script file. However, if the digital signature cannot be verified (e.g., if the signature file does not have a valid signature for the script vendor), the browser may generate an alert of the security concern, and disable execution of the script so that it is not executed within the web page containing the script tag, or on the user's browser. Similarly, a server detecting an invalid signature (or has in the above embodiments) may flag the script as invalid, and potentially remove and/or disable the tag from pages in which it is hosted.

Upon a determination that the hashes don't match, and/or that the signature file is not associated with a valid signature for the script vendor, the user's browser may simply not execute the script file. In embodiments where the customer's server(s) determine whether the hash and/or signature file is valid, the customer's server(s) may identify the hosted web pages that reference the script file, and remove the script from the appropriate pages before they are served to client browsers. The customer's server(s) may further automatically generate an alert, and transmit it to a security center for the customer's web hosting operations, and members of this operation team may manually review the hash and/or signature in question. If the alert has correctly identified a security concern, the operations team for security may disable all tags within hosted websites that call or otherwise attempt to execute the questionable script files.

In some embodiments, this process may be automated. The customer's hosting servers may include one or more software modules configured to manage the tags for each web page that references the script file. These software modules may comprise a script and/or tag manager configured to modify all pages that include the script tags or files, and to automatically disable or otherwise turn them off.

These software modules may render and receive input from one or more user interfaces (UI) including one or more UI controls configured to receive input from users to set one or more rules associated with scripts and/or tags (e.g., script tags or image tags). These rules (which may be stored in a database or software module logic) may define where a script should be included or determine that a specific tag should be included, or not included, or disabled given certain rules. The customer's server, which verifies the hash or signature file, could therefore validate the scripts and have code to automatically turn the scripts on and off.

Thus, the disclosed embodiments represent improvements to multiple technological arts, as well to the disclosed computing devices themselves (e.g., server computers, client computers, network devices, etc.). Specifically, as previously noted, the usage of script tags calling to script files on a third party vendor's server(s) reduces the amount of network traffic required for the hosting provider's server(s), allowing the hosting provider's servers to run more efficiently. The user of third party script vendor's script files also allows the hosting provider to offload the hosting and serving of script files to the third party vendor, thereby improving server efficiencies.

The data security technologies are also improved by the disclosed embodiments, which further improve the performance of the server and client computers themselves. Specifically, the disclosed embodiments ensure that the script files are not corrupted by unscrupulous users, which may, in turn, compromise the security, and in turn the efficiencies of the third party script vendors' and hosting providers' servers, as well as the end user client computers. By providing means to authenticate the source of the script files, the data security technologies are also improved. Therefore, multiple technological arts, as well as the computing devices themselves, are improved through use of the disclosed embodiments.

Several different environments may be used to accomplish the method steps of embodiments disclosed herein. FIG. 1 demonstrates a streamlined example and FIG. 2 demonstrates a more detailed example of an environment including a system and/or structure that may be used to accomplish the methods and embodiments disclosed and described herein. Such methods may be performed by any central processing unit (CPU) in any computing system, such as a microprocessor running on at least one server 110 and/or client 120, and executing instructions stored (perhaps as scripts and/or software, possibly as software modules/components) in computer-readable media accessible to the CPU, such as a hard disk drive on a server 110 and/or client 120.

The example embodiments shown and described herein exist within the framework of a network 100 and should not limit possible network configuration or connectivity. Such a network 100 may comprise, as non-limiting examples, any combination of the Internet, the public switched telephone network, the global Telex network, computer networks (e.g., an intranet, an extranet, a local-area network, or a wide-area network), a wired network, a wireless network, a telephone network, a corporate network backbone or any other combination of known or later developed networks.

At least one server 110 and at least one client 120 may be communicatively coupled to the network 100 via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPPoE), and/or any combination thereof.

The example embodiments herein place no limitations on whom or what may comprise users. Thus, as non-limiting examples, users may comprise any individual, entity, business, corporation, partnership, organization, governmental entity, and/or educational institution that may have occasion to organize/import contacts and/or send marketing campaigns.

Server(s) 110 may comprise any computer or program that provides services to other computers, programs, or users either in the same computer or over a computer network 100. As non-limiting examples, the server 110 may comprise application, communication, mail, database, proxy, fax, file, media, web, peer-to-peer, standalone, software, or hardware servers (i.e., server computers) and may use any server format known in the art or developed in the future (possibly a shared hosting server, a virtual dedicated hosting server, a dedicated hosting server, a cloud hosting solution, a grid hosting solution, or any combination thereof) and may be used, for example to provide access to the data needed for the software combination requested by a client 120.

The server 110 may exist within a server cluster, as illustrated. These clusters may include a group of tightly coupled computers that work together so that in many respects they can be viewed as though they are a single computer. The components may be connected to each other through fast local area networks which may improve performance and/or availability over that provided by a single computer.

The client 120 may be any computer or program that provides services to other computers, programs, or users either in the same computer or over a computer network 100. As non-limiting examples, the client 120 may be an application, communication, mail, database, proxy, fax, file, media, web, peer-to-peer, or standalone computer, cell phone, personal digital assistant (PDA), etc. which may contain an operating system, a full file system, a plurality of other necessary utilities or applications or any combination thereof on the client 120. Non limiting example programming environments for client applications may include JavaScript/AJAX (client side automation), ASP, JSP, Ruby on Rails, Python's Django, PHP, HTML pages or rich media like Flash, Flex or Silverlight.

The client(s) 120 that may be used to connect to the network 100 to accomplish the illustrated embodiments may include, but are not limited to, a desktop computer, a laptop computer, a hand held computer, a terminal, a television, a television set top box, a cellular phone, a wireless phone, a wireless hand held device, an Internet access device, a rich client, thin client, or any other client functional with a client/server computing architecture. Client software may be used for authenticated remote access to a hosting computer or server. These may be, but are not limited to being accessed by a remote desktop program and/or a web browser, as are known in the art.

The user interface displayed on the client(s) 120 or the server(s) 110 may be any graphical, textual, scanned and/or auditory information a computer program presents to the user, and the control sequences such as keystrokes, movements of the computer mouse, selections with a touch screen, scanned information etc. used to control the program. Examples of such interfaces include any known or later developed combination of Graphical User Interfaces (GUI) or Web-based user interfaces as seen in the accompanying drawings, Touch interfaces, Conversational Interface Agents, Live User Interfaces (LUI), Command line interfaces, Non-command user interfaces, Object-oriented User Interfaces (OOUI) or Voice user interfaces. The commands received within the software combination, or any other information, may be accepted using any field, widget and/or control used in such interfaces, including but not limited to a text-box, text field, button, hyper-link, list, drop-down list, check-box, radio button, data grid, icon, graphical image, embedded link, etc.

The server 110 may be communicatively coupled to data storage 130 including any information requested or required by the system and/or described herein. The data storage 130 may be any computer components, devices, and/or recording media that may retain digital data used for computing for some interval of time. The storage may be capable of retaining stored content for any data required, on a single machine or in a cluster of computers over the network 100, in separate memory areas of the same machine such as different hard drives, or in separate partitions within the same hard drive, such as a database partition.

Non-limiting examples of the data storage 130 may include, but are not limited to, a Network Area Storage, ("NAS"), which may be a self-contained file level computer data storage connected to and supplying a computer network with file-based data storage services. The storage subsystem may also be a Storage Area Network ("SAN"—an architecture to attach remote computer storage devices to servers in such a way that the devices appear as locally attached), an NAS-SAN hybrid, any other means of central/shared storage now known or later developed or any combination thereof.

Structurally, the data storage 130 may comprise any collection of data. As non-limiting examples, the data storage 130 may comprise a local database, online database, desktop database, server-side database, relational database, hierarchical database, network database, object database, object-relational database, associative database, concept-oriented database, entity-attribute-value database, multi-dimensional database, semi-structured database, star schema database, XML database, file, collection of files, spreadsheet, and/or other means of data storage such as a magnetic media, hard drive, other disk drive, volatile memory (e.g., RAM), non-volatile memory (e.g., ROM or flash), and/or any combination thereof.

The server(s) 110 or software modules within the server(s) 110 may use query languages such as MSSQL or MySQL to retrieve the content from the data storage 130. Server-side scripting languages such as ASP, PHP, CGI/Perl, proprietary scripting software/modules/components etc. may be used to process the retrieved data. The retrieved data may be analyzed in order to determine the actions to be taken by the scripting language, including executing any method steps disclosed herein.

The software modules/components of the software combination used in the context of the current invention may be stored in the memory of—and run on—at least one server 110. As non-limiting examples of such software, the paragraphs below describe in detail the software modules/components that make up the software combination. These software modules/components may comprise software and/or scripts containing instructions that, when executed by a microprocessor on a server 110 or client 120, cause the microprocessor to accomplish the purpose of the module/component as described in detail herein. The software combination may also share information, including data from data sources and/or variables used in various algorithms executed on the servers 110 and/or clients 120 within the system, between each module/component of the software combination as needed.

A data center 140 may provide hosting services for the software combination, or any related hosted website including, but not limited to hosting one or more computers or servers in a data center 140 as well as providing the general infrastructure necessary to offer hosting services to Internet users including hardware, software, Internet web sites, hosting servers, and electronic communication means necessary to connect multiple computers and/or servers to the Internet or any other network 100.

Figure 2:
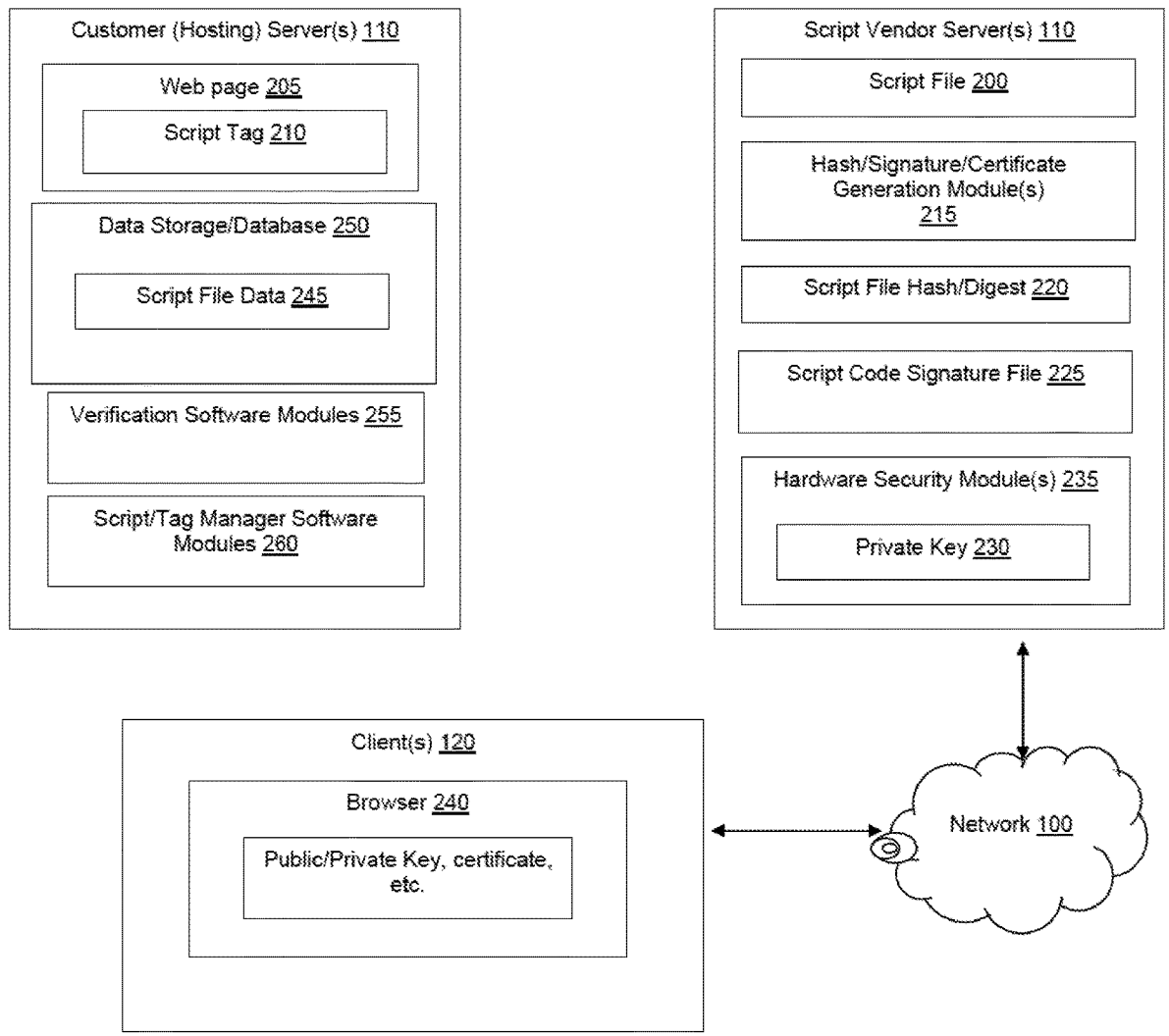
FIG. 2 illustrates a more detailed possible system for authenticating a script file using a hash or a digital signature.

FIG. 2 shows a more detailed example embodiment of an environment for the systems, and for accomplishing the method steps, disclosed herein. As non-limiting examples, all disclosed software modules may run on one or more server(s) 110 and may include one or more user interfaces generated by the server(s) 110 and transmitted to and displayed on the client(s) 120. The user interface(s) may be configured to receive input from the user and transmit this input to the server(s) 110 for the administration and execution of the software 200, using data in data storage 130 associated with the software modules 200. Thus, the disclosed system may be configured to execute any or all of the method steps disclosed herein. Server(s) 110 may be hosted by any entity, possibly a hosting provider, a domain name registrar, a website development company, any other software service provider or any combination thereof.

As seen in FIG. 2, a script vendor may generate one or more script files 200. These files may be publicly available, or available to any customers of the script vendor. Customers of the script vendor, or any other users of the script file 200, may host websites on their servers, and each of these websites may include one or more web pages 205 containing HTML or other browser-friendly source code. This source code may include one or more script tags 210 containing a URL directing the web page to the IP address for the vendor's server in order to download and execute the script file 200 (e.g., <script src="https://www.vendor.com/examplescript.js">). The script file, when executed, may optimize the website, improve website performance, or perform any other script functionality known in the art.

The script vendor's servers may include instructions within one or more software modules, which may be stored within the server's 110 memory and executed by the server's processor(s). In some embodiments, these software modules may include one or more software modules 215 configured to generate data, possibly in the form of text strings or files, used to verify the source, security, and integrity of the script file 200. As described below, this verification data may include a digital code signature generated from a vendor's private key 230 in a public/private key pair within a PKI received from a certificate authority. In some embodiments, the script vendor's servers may automatically generate the verification data 220, 230 each time a script file is generated or updated.

To reassure customers of the validity of the source, security, and integrity of the script file 200, script vendors may provide verification technologies, including any combination of hashes generated by cryptographic hashing algorithms 220 and digital signatures generated from a private key in a private/public key pair 225.

In order to protect the script vendor's private key 230 the script vendor may follow industry best practices, including storing the private key 230, in secure, tamper-proof, cryptographic hardware devices known as hardware security modules (HSMs) 235. These HSMs 235 may be physical computing devices (e.g., plug-in cards or external devices that attach to a server, or a private server operated out of band by the script vendor) that safeguard and manage digital keys. In some embodiments, the HSMs may also provide strong authentication and/or cryptoprocessing.

Figure 3:
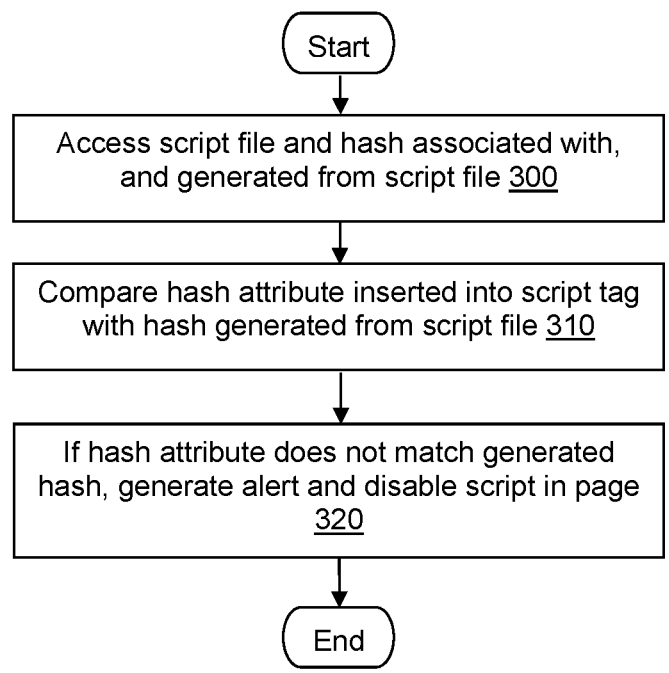
FIG. 3 is a flow diagram illustrating a possible embodiment of a method for authenticating a script file using a hash.

Turning now to step 300 of FIG. 3, the script vendor's server(s) may run one or more software modules 215 for generating and storing a hash 220 from, and/or associated with data from the script file 200. A user's browser 240, and/or the customer's server(s) may use the hash/digest 220 as a security feature enabling browsers and/or servers to verify that the script file 200 is downloaded and executed without a third-party having injected any additional content, or without unexpected modifications of any kind.

To generate the hash/digest, the third party vendor's server(s) may apply a mathematical algorithm, or in other words a hash function, mapping the data within the script file (a "message," which may be of any size) to a bit string of a fixed size, without encrypting the script file 200 itself. Requirements for the hash function may include that the hash function be deterministic, meaning that the same message always results in the same hash, and that the hash function causes a small change to the message to change the hash value so extensively that the new hash appears uncorrelated with the old hash value. In other words, the hash function must be collision resistant, meaning that it is very hard to find data that will generate the same hash value, and also that it is infeasible to find two different messages with the same hash. Collision resistance is accomplished in part by generating very large hash values. For example, SHA-1, one of the most widely used cryptographic hash functions, generates 160 bit values.

The hash function may also comprise a one way function, meaning that the script vendor's server(s) compute the hash function on input data/messages provided in the form of the source code, name, metadata, or any other data associated with the script file 200. However, the hash function may be infeasible to invert, meaning that the only way to generate a message from the hash value is to try all possible messages. The output, hash value, or hash 220 is also referred to as the cryptographic hash, message digest or digest. This hash 220 may serve as a means of reliably identifying a file, such as the script file 200, using the hash 220 to uniquely identify the file and/or file content, locate file sources, download the file, and/or verify its contents.

The script vendor may use any tools known in the art for generating hashes/digests 220. For example, the script vendor may generate SRI hashes from tools such as the SRI HASH GENERATOR or a command-line with openssl using a command such as: cat FILENAME.js|openssl dgst -sha384-binary|openssl enc-base64-A.

In embodiments where the software modules 215 generate a hash 220 from, or associated with the script file 200, the software modules 215 may be configured to automatically transmit or otherwise communicate, out of band, the expected hash/digest 220 to all customers of the third party vendor whose web pages reference the script file 200. For example, a script vendor may transmit an expected hash/digest sha384-abC1Def2hij3+KLM4/nOp of the script file examplescript.js, and a copy of the script file 200 may be hosted at https://vendor.com/examplescript.js. In some alternate embodiments, the hash may be stored on a server separate from, and out of band with, the server on which the script file 200 is stored. Using the expected hash file, a user's browser (or customer server), may verify the integrity of the script by downloading the script, generating a hash associated with the script, and comparing it to the known value received from the script vendor.

Figure 4:
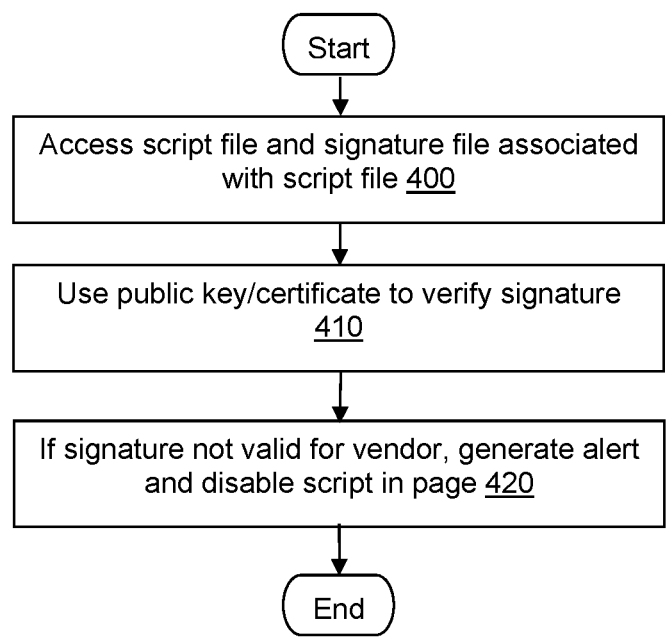
FIG. 4 is a flow diagram illustrating a possible embodiment of a method for authenticating a script file using a digital signature.

Turning now to step 400 or FIG. 4, the script vendor's server(s) may run one or more software modules 215 for generating and storing code signatures 225 from a private key 230 stored on the script vendor's server(s) 110. A user's browser 235, and/or the customer's server(s) may use the script code signatures 225 as security features enabling browsers 240 and/or servers 110 to verify that the script file 200 is downloaded and executed without a third-party having injected any additional content, or without unexpected modifications of any kind.

The script vendor's server(s) may utilize a PKI, analogous to the technologies used in SSL or SSH processes, which includes a private key 225 and a public key 230 making up a private/public key pair: two separate and different keys that are mathematically linked. The script vendor's server(s) may generate and/or store the private key pair 225, 230. As noted above and shown in FIG. 2, the script vendor's server(s) may securely store the private key 230 within an HSM. Because private keys stored within software on general purposes computers are susceptible to compromise, the efficacy and integrity of software code signing as an authentication mechanism as described below depends on the security of the underpinning signing keys, and therefore on the publishers of the private key 230 (e.g., the script vendor) securing private keys against unauthorized access.

In embodiments where a user's browser 240 or customer's server authenticates the script file 200 using a digital signature used to sign the code of the script file 200, a recognized, well-known certificate authority may generate a public/private key pair 225/230 to be used by the script vendor. By using a well-known certificate authority, the script file 200 may be signed and verified via recognition of the trusted certificate authority. The script vendor may store the private key out of band on a server separate from the server hosting the script file 200, as described above. The server(s) may be further configured to make the public key 225 accessible to customers or other users, possibly via a server available to the customers and/or users. As a non-limiting example, the script vendor's server(s) may store the private key 230, while transmitting the public key for accessibility by customers or other users.

The script vendor's server(s) may also utilize the private key within the key pair (in a similar process to that employed by SSL or SSH) to generate a digital signature 225 used to sign the source code within the script file 200. The private key 230 may create the digital signature, and the public key 225 may be used by the browser or the customer's server(s) to verify a digital signature.

Since the source, security, or integrity of the code within the script file 200 may not be immediately evident to an executing browser, the script vendor's server(s), as a third party distributor of the code, may use one or both keys 225, 230 to encrypt the message or related values, and to sign their script. For example, each time the script vendor builds or modifies the script file 200, the script vendor's server(s) may use the private key 230 to generate a unique digital signature for the script file 200, thereby verifying the source code through code signing.

In some embodiments, the signature may be stored in a sister file, sharing the script file's 220 name, but replacing the extension with a .sig extension. This .sig file may be stored and published on a public server in association with the script file 200. For example, the script file examplescript.js may have an accompanying and associated signature file examplescript.sig. In some embodiments, a URL for accessing the signature file may be identical to the URL for accessing the script file, with the exception of the extension. Thus, the signature file associated with the script found at http://www.vendor.com/examplescript.js may have a URL of http://www.vendor.com/exam plescript.sig.

The script vendor's server(s), therefore, digitally sign the script to confirm that the script vendor is the script file's 200 author, further guaranteeing that the source code within the script file 200 has not been altered or corrupted since it was signed. Updates to the existing script may also use code signing to ensure that it is not possible for others to maliciously distribute code. In some embodiments, this process is used in combination with the cryptographic hash described above to validate the script file's 200 authenticity and integrity.

As noted above, a trusted certificate authority may generate a public/private key pair. The script vendor may make the public key from the public/private key pair public, possibly by publishing the public key in a predetermined location, or, in embodiments where the customer's server is verifying the script file, transmitting the public key to the customer prior to verification. This information may be used to prove the ownership of the public key 225. As a non-limiting example, the certificate verifying the integrity of the script file 200 may comprise a message/digital signature generated, encrypted and/or decrypted using the private key.

In some embodiments, the customer, or administrators for users hosting web pages on the customer's web servers, may include a script tag that includes the name of the public key or certificate. In this way, the digital signature may be used in a manner similar to the hash described above. This may represent a simple embodiment because the file with the scripts would also contain the public certificates used to verify the script file 200.

Returning to FIG. 2, customers of the script vendor may operate one or more hosting servers 110. These servers 110 may host one or more web pages 205 within one or more websites accessed by one or more users, possibly via a web browser 240. One or more of these web pages 205 may include a script tag (e.g., <script src="http://www.vendor.com/examplescript.js">. One or more users may access the browser 240, which may transmit a request to the customer's web server(s) 110 for a web page 205 hosted on that server. The script customer's server(s) 110 may then process the request to generate the HTML for the web page 205.

For example, as the customer's hosting server(s) 110 render a web page, it may identify the script tag <script src="http://www.vendor.com/example.js">. The customer's hosting server(s) 110 may then identify the URL within the script tag 210, and either download the script file 200 from that URL, or generate instructions for the browser 240 to download the script file 200 from that URL and incorporate it into the source code for the rendered web page 205 for execution by the browser. The customer's hosting server(s) 110 then transmit the script file, the URL, and/or the instructions to the client 120 for interpretation and/or execution by the browser 240. The browser 240 may then receive, interpret, and/or execute the transmitted code when received.

Turning now to FIGS. 3-4, one or more browsers, or one or more software modules running on the customer's or other server(s) 110 may access the script file, as well as the hash (Step 300), or the signature file (Step 400) associated with the script file; use the hash (Step 310), the signature file (Step 410) to authenticate the script file; and if the hash file (Step 320) or the signature (Step 420) do not authenticate the script file, generate an alert and disable the script in that web page.

In browser-based embodiments described below, the customer's web server may transmit the HTML to the requestor's browser. This HTML code may include script tags identifying the URL of a script to be executed. This may include third party code that the customer has no control over, such as the script file hosted on the vendor's server(s). The browser parses the HTML code to process the script tag to request the script file from the vendor's server(s), and, in embodiments in which the browser verifies the hash, execute the comparison of the known hash with the generated hash. In server-based embodiments, also described below, the server may also verify the hash by identifying the URL for the script file, and regularly testing the validity of the script file using the hash or digital signature, as described in more detail below.

In browser-based embodiments, the customer's web server 110 may transmit the HTML to the requestor's browser. This HTML code may include script tags 210 identifying the URL of the IP address for the script vendor's server(s) 110 hosting the script file 200 to be executed. The browser parses the HTML code to process the script tag to request the script file from the vendor's server(s).

The customer may desire additional security, since the script file 200 is hosted on a script vendor's server(s) 110 that the customer has no control over. Thus, in the disclosed browser-based embodiments, the user's browser 240 may be configured to follow an established standard, in which the browser 240, prior to executing the code in the script file 200, requires a separate verification of the source, security, and/or integrity of the script file 200. This verification may include the browser 240 identifying a known hash, and generating a hash from the script file. If the generated script matches the known script, the browser 240 may verify the script file 200 within the browser 240, and execute it accordingly. Similarly, the browser 240 may verify a signature file (Step 420) associated with the script file 200 prior to executing the script file 200.

The customer's server(s) 110 may access and serve this verification data when rendering the web page to be served, and may transmit the rendered HTML, as well as the verification data to the browser 240 on the client computer 130. The browser may then verify the validity of the script file using the verification data (Step 310, 410). If the browser determines that the verification data is valid, the browser may be configured to execute the script. Otherwise, the browser may be configured to disable the script (Step 320, 420).

However, because establishing such a standard for browsers may require approval through a long administrative process, as well as the time and resources required to develop and distribute a browser that includes the configuration to include such a standard, disclosed embodiments may also include instructions within one or more software modules on the customer's server(s) 110 configured to perform the verification.

Figure 5:
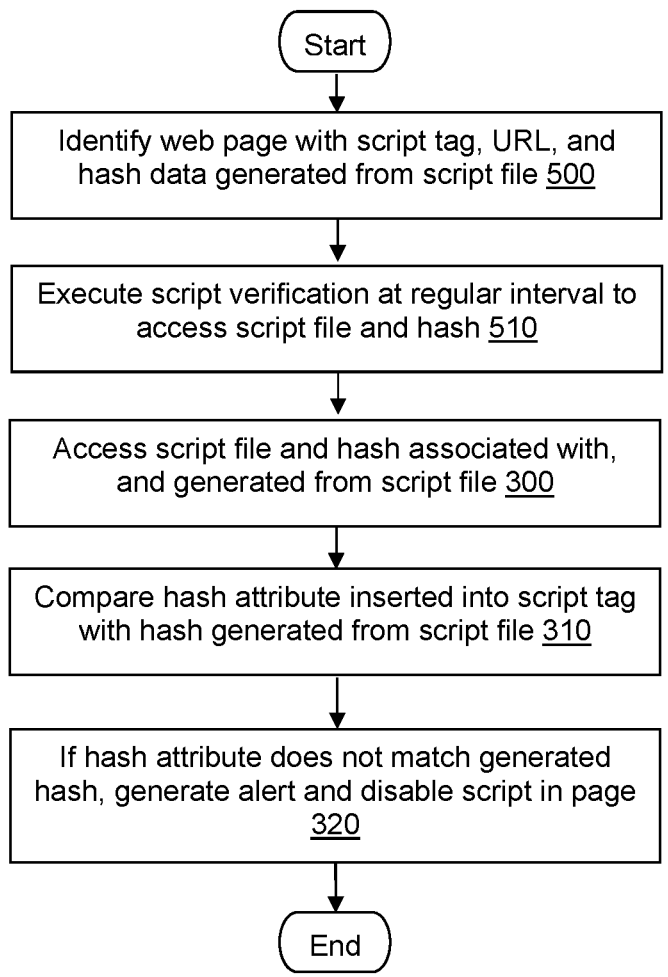
FIG. 5 is a flow diagram illustrating a possible embodiment of a server-based method for authenticating a script file using a hash.

Thus, in the server-based embodiment seen in FIGS. 5, the server may identify the URL for specific script files 200 from the vendor's server(s) 110 (Step 500). The customer's server(s) may then test the validity of the script file using the hash or digital signature, as described in more detail below (Step 510). The server(s) may repeat this validity test at any regular interval or constantly to determine the validity of the script files the server(s) are monitoring. The server(s) 110 may store the URL for one or more script files 200 stored on the script vendors' servers, which the customer's server 110 may be monitoring. For example, in embodiments where the server verifies the code using a signature file, the URL may be customer's servers may list of sources for downloadable signature files may be stored, where each script file in the list is associated with a signature file, possibly sharing the file name and replacing the extension with .sig. In some embodiments, the customer's servers may store a URL to both the script file 200 and the signature file 225 associated with the script. Returning to Step 510, the software modules 255 running on the customer's server(s) may regularly test the validity of each script file 200 listed in the script file data.

Figure 6:
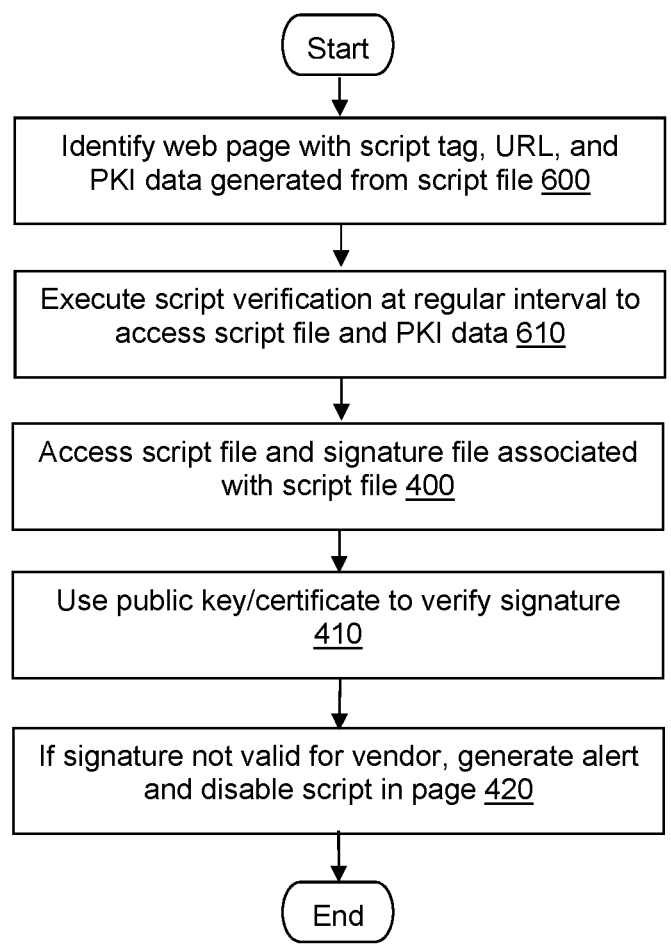
FIG. 6 is a flow diagram illustrating a possible embodiment of a method for authenticating a script file using a digital signature.

In FIG. 6, analogous processes may be performed in browser-based embodiments. The browser 240 parses the script tag 210 to identify the URL identifying the IP address of the script vendor's server(s) hosting the script file 200. In embodiments such as that represented in FIG. 6, the browser 240 may compare a known hash with a hash generated from the script file 200. The browser 240 or server modules 255 may therefore determine that each script file 200 has not been modified since the hash has become available.

In some embodiments, such as that seen in FIG. 7, this process may be automated. The customer's hosting servers may include one or more script and/or tag management software modules 260 configured to manage the tags for each web page that references the script file 200. These script and/or tag management software modules 260 may comprise a script and/or tag manager software configured to modify all pages that include the script tags or files, and to automatically disable or otherwise turn them off.

These software modules 260 may render and receive input from one or more user interfaces (UI), such as that seen in FIG. 7, including one or more UI controls configured to receive input from users to set one or more rules associated with scripts and/or tags (e.g., script tags or image tags). These rules (which may be stored in a database or software module logic?) may define where a script should be included or determine that a specific tag should be included, or not included, or disabled given certain rules. The customer's server could therefore validate the scripts and have code to automatically turn the scripts on and off.

The steps included in the embodiments illustrated and described in relation to FIGS. 1-7 are not limited to the embodiment shown and may be combined in several different orders and modified within multiple other embodiments. Although disclosed in specific combinations within these figures, the steps disclosed may be independent, arranged and combined in any order and/or dependent on any other steps or combinations of steps.

Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:

1. A system, comprising at least one processor executing instructions within a memory coupled to a first server computer coupled to a network, the instructions causing the first server computer to:
   receive a plurality of user-defined rules for managing a plurality of script tags;
      wherein the plurality of user-defined rules comprise at least one user-defined rule for disabling execution of a script file;
   access a web page hosted by the first server computer, wherein the web page includes a reference to the script file and a first hash data, wherein the first hash data is at least partially determined by a contents of the script file;
   access the script file and a second hash data using the reference in the web page, wherein the script file and the second hash data are stored on a second server computer;
   determine the first hash data does not match the second hash data;
   responsive to a determination that the second hash data does not match the first hash data:
      i) prevent the first server computer from executing a portion of the script file,
      ii) transmit a notification to a security center operating the first server computer, and
      iii) automatically disable the execution of the script file using the at least one user-defined rule for disabling execution of the script file.

2. The system of claim 1, wherein the first hash data is generated as output from a one-way cryptographic hash function algorithm executed using a copy of the script file, or a data associated with the script file, as an input.

3. The system of claim 1, wherein the second hash data is generated subsequent to an access of the script file.

4. The system of claim 1, wherein the instructions further cause the first server computer, responsive to a determination that the first hash data matches the second hash data, to download and execute the script file.

5. The system of claim 1, wherein the script file is a JavaScript file.

6. The system of claim 1, wherein the at least one processor executing instructions accesses the web page in a manner analogous to a web browser and provided by a plurality of servers at a plurality of IP address locations within a network.

7. The system of claim 1, further comprising a web browser running on a client computer coupled to the network, the web browser configured to:
   request the web page;
   download the script file;
   generate the second hash data; and
   execute the script file.

8. The system of claim 1, wherein:
   the web page is hosted on the first server computer; and
   the script file and the second hash data are hosted on the second server computer, which is operated by a third party script vendor.

9. A method, comprising:
   receiving a plurality of user-defined rules for managing a plurality of script taps;
      wherein the plurality of user-defined rules comprise at least one user-defined rule for disabling execution of a script file;
   accessing, by a first server computer coupled to a network, a web page hosted by the first server computer, wherein the web page includes a reference to a script file and a first hash data, wherein the first hash data is at least partially determined by a contents of the script file;
   accessing, by the first server computer, the script file and a second hash data using the reference in the web page, wherein the script file and the second hash data are stored on a second server computer;
   determining, by the first server computer, the first hash data does not match the second hash data; and
   responsive to a determination that the second hash data does not match the first hash data;
      i) preventing, by the first server computer, the first server computer from executing a portion of the script file,
      ii) transmitting a notification to a security center operating the first server computer, and
      iii) automatically disabling the execution of the script file using the at least one user-defined rule for disabling execution of the script file.

10. The method of claim 9, wherein the first hash data and the second hash data are generated as output from a one-way cryptographic hash function algorithm using the script file, or a data associated with the script file, as an input.

11. The method of claim 9, wherein the second hash data is generated subsequent to an access of the script file.

12. The method of claim 9, wherein the instructions further cause the first server computer, responsive to a determination that the first hash data matches the second hash data, to download and execute the script file.

13. The method of claim 9, wherein the script file is a JavaScript file.

14. The method of claim 9, further comprising accessing, by the first server computer, the script file by executing a request of the web page analogous to a web browser.

15. The method of claim 9, further comprising executing a web browser running on a client computer coupled to the network, the web browser configured to:
   request the web page;
   download the script file;
   generate the second hash data;
   authenticate the second hash data; and
   execute the script file.

16. The method of claim 9, wherein:
   the web page is hosted on the first server computer; and
   the script file, and the second hash data is hosted on the second server computer, which is operated by a third party script vendor.

* * * * *